(12) United States Patent
Kurumisawa

(10) Patent No.: US 7,038,672 B2
(45) Date of Patent: May 2, 2006

(54) ELECTRO-OPTICAL DEVICE INCLUDING A DRIVE CIRCUIT

(75) Inventor: Takashi Kurumisawa, Shiejiri (JP)

(73) Assignee: Seiko Epson Corporation, Tokyo (JP)

( * ) Notice: Subject to any disclaimer, the term of this patent is extended or adjusted under 35 U.S.C. 154(b) by 571 days.

(21) Appl. No.: 10/090,638

(22) Filed: Mar. 6, 2002

(65) Prior Publication Data

US 2002/0130851 A1    Sep. 19, 2002

(30) Foreign Application Priority Data

Mar. 9, 2001    (JP)    ............................ 2001-067650

(51) Int. Cl.
*G09G 5/00*    (2006.01)

(52) U.S. Cl. .................................................. 345/206

(58) Field of Classification Search ................ 345/87, 345/92, 93, 98, 100, 71; 349/150, 113; 174/260; 257/434

See application file for complete search history.

(56) References Cited

U.S. PATENT DOCUMENTS

| | | | | |
|---|---|---|---|---|
| 5,467,210 A | * | 11/1995 | Kishigami | ................... 349/150 |
| 6,486,412 B1 | * | 11/2002 | Kato | ........................... 174/260 |
| 6,809,390 B1 | * | 10/2004 | Toda et al. | .................. 257/434 |
| 2002/0118325 A1 | * | 8/2002 | Hinata et al. | ................ 349/113 |

FOREIGN PATENT DOCUMENTS

| | | |
|---|---|---|
| JP | A-1-235922 | 9/1989 |
| JP | A-2000-276070 | 10/2000 |

* cited by examiner

*Primary Examiner*—Chanh Nguyen
(74) *Attorney, Agent, or Firm*—Oliff & Berridge, PLC

(57) ABSTRACT

Since a dimension of a picture-frame area is small, a line width of routing wirings has to be minute (very small). Thus, it has been difficult to drive an electro-optical element highly accurately. In an electro-optical device of the invention, a first substrate is formed with a plurality of first wirings through which a drive circuit supplies a plurality of first signals to a plurality of first electrodes. A second substrate is formed with a plurality of second wirings through which the drive circuit supplies the plurality of first signals to the plurality of first electrodes. The plurality of second wirings faces and is connected to the plurality of first wirings through a transfer member.

16 Claims, 12 Drawing Sheets

(a)

(b)

(c)

(a)

(b)

Related Art

Related Art

Related Art

ELECTRO-OPTICAL DEVICE INCLUDING A DRIVE CIRCUIT

BACKGROUND OF THE INVENTION

1. Field of Invention

The present invention relates to an electro-optical device that includes an electro-optical element, such as liquid crystals, and to an electronic apparatus including the electro-optical device.

2. Description of Related Art

A liquid crystal display for displaying a variety of information is widely used for mobile electronic devices, such as a notebook personal computer, a mobile electronic device and a wristwatch, for example.

FIGS. 11(a), 11(b) and 12 are schematics illustrating a configuration of a related art liquid crystal display. In the related art liquid crystal display 120 shown in FIG. 12, in which a liquid crystal display shown in FIGS. 11(a) and 11(b) is enhanced from the viewpoint of the arrangement of a display screen, liquid crystals arranged in a matrix are held by a substrate 121 on which a plurality of electrodes 122 for driving the liquid crystals are formed column-wise and a substrate 123 on which a plurality of electrodes 125 for driving the liquid crystals are formed row-wise.

The electrodes 122 formed column-wise are connected to a driving element 130 that supplies both the electrodes 122 and 125 with signals for driving the liquid crystals via a plurality of routing wirings 131, and also the electrodes 125 formed row-wise are connected thereto via a plurality of routing wirings 128.

However, since the routing wirings 128 are required to deposit in the picture-frame areas 126 and 127 that are small due to ensuring of a large display area, the line width of each routing wiring 128 is necessitated to be minute. This increases the resistance value of the routing wiring 128, which makes it difficult to accurately drive the crystal liquids that sensitively react to a voltage difference.

SUMMARY OF THE INVENTION

In order to address the problem described above, an electro-optical device in accordance with the present invention includes a first substrate formed with a plurality of first electrodes that supplies a plurality of first signals to drive a plurality of electro-optical elements, and a second substrate facing the first substrate, the second substrate formed with a plurality of second electrodes that supplies a plurality of second signals to drive the plurality of electro-optical elements, with the plurality of first electrodes and the plurality of second electrodes formed in a matrix shape. Further, the electro-optical device includes a drive circuit connected to the first substrate or the second substrate to supply the plurality of first signals and the plurality of second signals to the plurality of first electrodes and the plurality of second electrodes, respectively. The first substrate is formed with a plurality of first wirings through which the drive circuit supplies the plurality of first signals to the plurality of first electrodes, and the second substrate is formed with a plurality of second wirings through which the drive circuit supplies the plurality of first signals to the plurality of first electrodes, the plurality of second wirings facing and connected to the plurality of first wirings through a transfer member.

Furthermore, the plurality of first wirings has wiring portions extending in parallel with each other, and the plurality of second wirings has wiring portions extending in parallel with each other. Preferably, a face defined by the wiring portion of each of the plurality of first wirings and the corresponding wiring portion of each of the plurality of second wirings is orthogonal to each of a face defined by the wiring portions of the plurality of first wirings and a face defined by the wiring portions of the plurality of second wirings.

Moreover, in another electro-optical device in accordance with the invention, a substrate formed with a plurality of signal electrodes faces a substrate formed with a plurality of scanning electrodes, with the plurality of signal electrodes and the plurality of scanning electrodes arranged in a matrix shape when viewed in a plane to define image display regions. The substrate is formed with a drive circuit to drive the signal electrodes and the scanning electrodes, and the drive circuit is connected to each of the signal electrodes or each of the scanning electrodes through a plurality of routing wirings formed on each of the substrates. Routing wirings to connect the drive circuit to the electrode units are formed on one of the substrates that corresponds to a picture-frame area located at the end side of the electrodes extending in one of the directions along which the plurality of electrodes are arranged in a matrix shape, and routing sub-wirings are formed on a picture-frame area on the other substrate not formed with the routing wirings so as to face the routing wirings. The routing wirings and the routing sub-wirings facing each other on both the substrates are conducted by a transfer member laid between the substrates.

BRIEF DESCRIPTION OF THE DRAWINGS

FIGS. 6(a), 6(b) and 6(c) are plan views illustrating the liquid crystal display of a second embodiment; wherein FIG. 6(a) is a schematic plan view of the liquid crystal display; FIG. 6(b) is a schematic plan view illustrating the electrodes and the routing wirings on one of the substrates; and FIG. 6(c) is a schematic plan view illustrating the electrodes and the routing wirings on the other of the substrates;

FIGS. 10(a), 10(b) and 10(c) are perspective views illustrating application examples of the electronic apparatus equipped with the electro-optical device in accordance with the invention; wherein FIG. 10(a) is a perspective view of a mobile telephone; FIG. 10(b) is a perspective view of a mobile information terminal; and FIG. 10(c) is a perspective view of a wristwatch-type electronic device;

FIG. 11(*b*) is a side plan view;

DETAILED DESCRIPTION OF PREFERRED EMBODIMENTS

Hereafter, embodiments of the present invention will be described with reference to drawings, but the invention is not limited to the following embodiments.

<First Embodiment>

Figure 1:
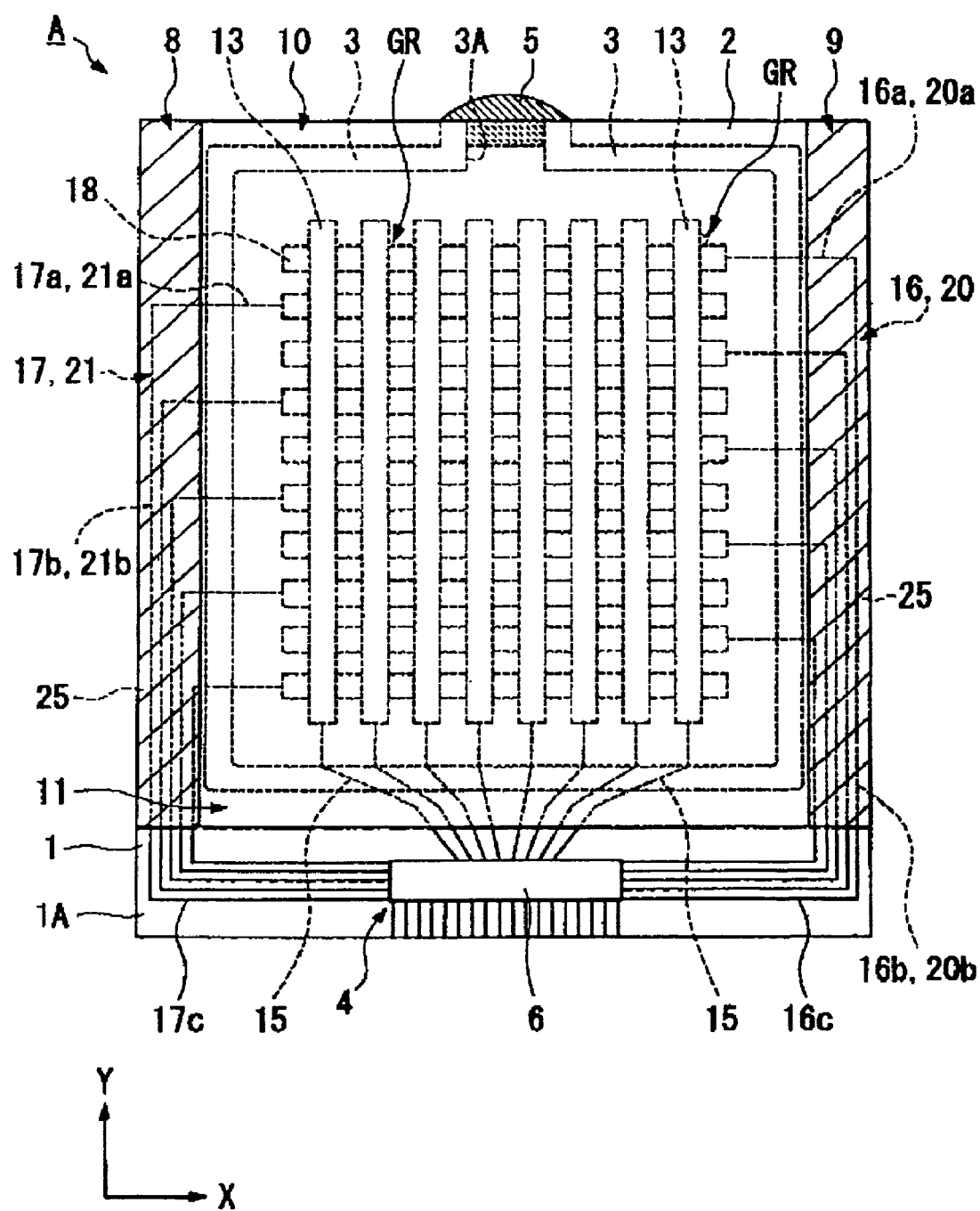
FIG. 1 is a plan view illustrating the schematic structure of a liquid crystal display of the first embodiment in accordance with the present invention.
Figure 2:
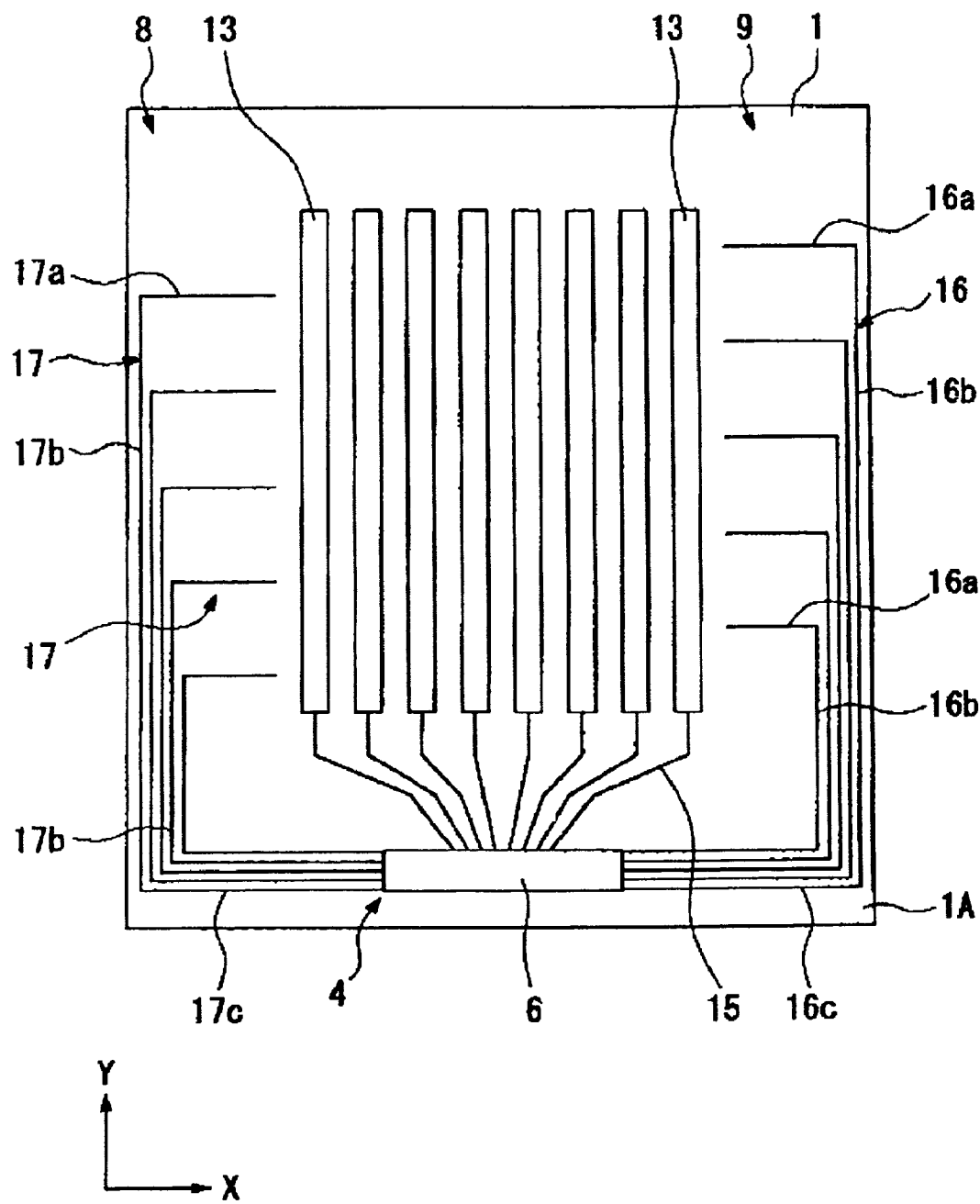
FIG. 2 is a plan view illustrating one of the substrates of the same liquid crystal display.
Figure 3:
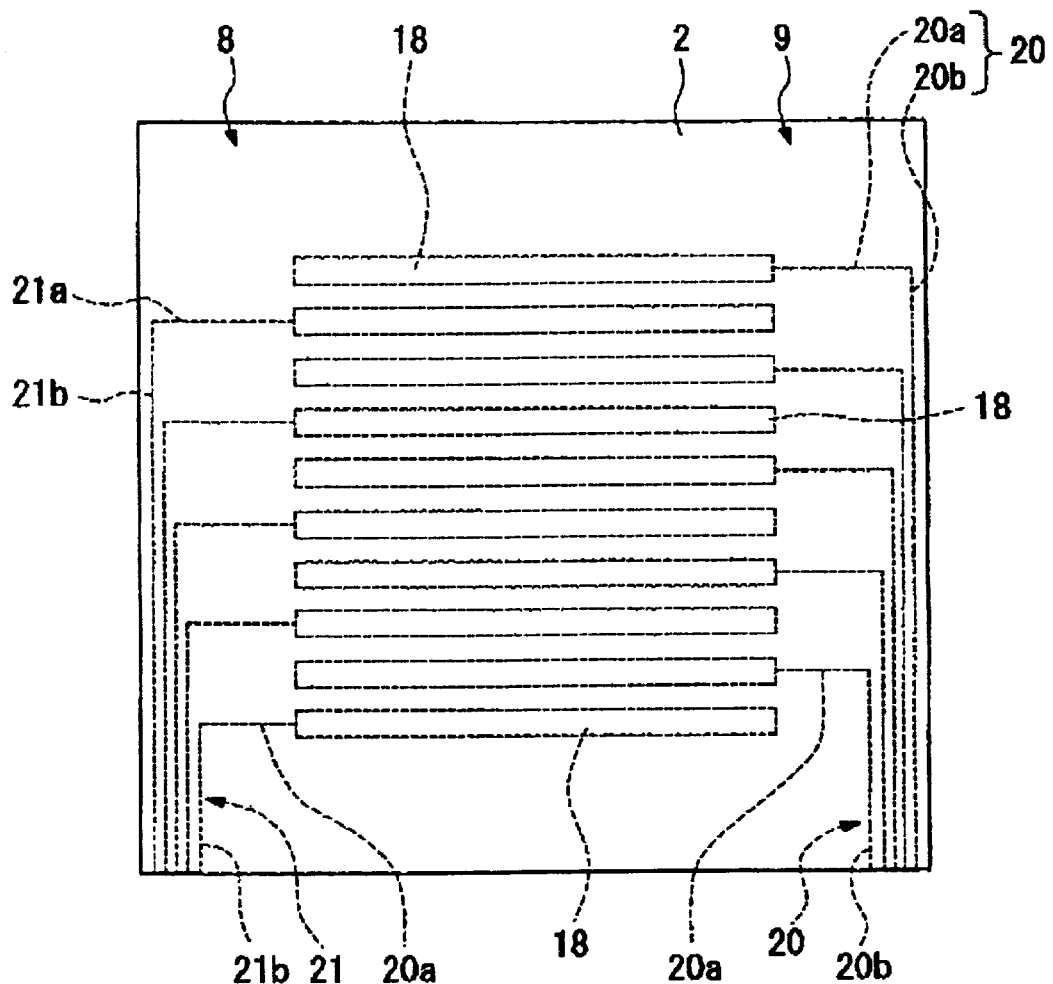
FIG. 3 is a plan view illustrating the other of the substrates of the same liquid crystal display.
Figure 4:
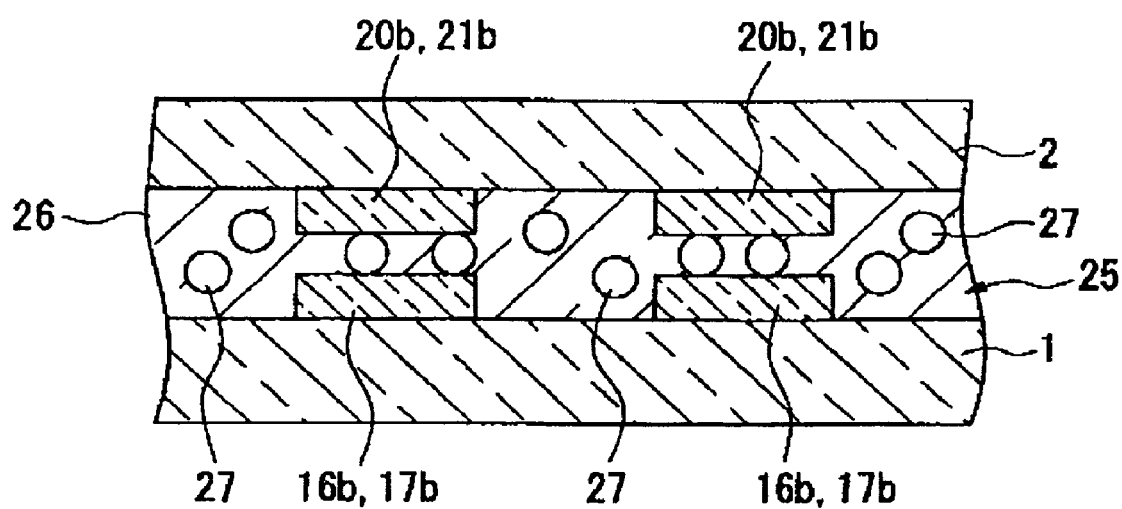
FIG. 4 is a sectional view of the connecting portion of the routing wirings and the routing sub-wirings of the liquid crystal display.

FIGS. 1 to 4 depict a first embodiment where the invention is applied to a passive matrix liquid crystal display (electro-optical device). FIG. 1 is a plan view illustrating the whole structure of a liquid crystal display A. FIG. 2 is a plan view illustrating one of substrates of the liquid crystal display A. FIG. 3 is a plan view illustrating the other of the substrates of the liquid crystal display A. FIG. 4 is a sectional view of the structure of a portion of connecting routing wirings and routing sub-wirings. Additionally, in each of the drawings, layers and members are drawn in different scales in order to allow each layer or each member to be recognizable on the drawings.

The liquid crystal display A of this embodiment is disposed with a substrate 1, which is one of the substrates, facing a substrate 2, which is the other of the substrates. Liquid crystals are sealed between the substrates. More specifically, a seal layer 3 that is located between the substrates 1 and 2, and is arranged in an approximately rectangular shape when viewed in a plane is disposed on the peripheries of the substrates 1 and 2. The liquid crystals are sealed, surrounded by the substrates 1 and 2 and the seal layer 3.

Furthermore, on one part side of the seal layer 3 (on the upper end side in FIG. 1), a filling port 3A to inject liquid crystals is formed so as to reach the ends of the substrates 1 and 2. The filling port 3A is closed with a sealing material 5, and thereby the liquid crystals are sealed.

A lateral width of each of the substrates 1 and 2 in a state shown in FIG. 1 (a lateral width of each of the substrates 1 and 2 in a state of being disposed facing each other when viewed in a plane) is set to be equal. A longitudinal width of the substrate 1 (a longitudinal width shown in FIG. 1) is formed to be slightly longer than the substrate 2. A one-chip type drive circuit (drive circuit element) 6 is disposed in an installation area 4 in the center of an end side IA of the substrate 1 that is disposed to extend from the substrate 2. Additionally, as shown in FIG. 1, inside the seal layer 3 in a state that the substrates 1 and 2 face each other, a plurality of electrodes (electrode) 13 and a plurality of electrodes (electrode) 18, which will be described below, are arranged in a matrix shape, and these electrodes form rectangular image display regions GR.

Subsequently, a left-side picture-frame area 8 is formed at the left-side of the image display regions GR shown in FIG. 1. A right-side picture-frame area 9 is formed in at right-side of the image display regions GR. An upper-side picture-frame area 10 is formed at the upper side of the image display regions GR. An under-side picture-frame area 11 is formed at the under-side of the image display regions GR. Among these elements, the picture-frame areas 8 and 9 at the left and right sides of the image display regions GR are formed to have an equal width.

Next, the electrodes, the routing wirings and the routing sub-wirings formed on the substrates 1 and 2 will be described in detail. In addition, the following electrodes or wirings are basically formed of transparent conductive materials, such as an ITO (indium-tin oxide). However, the routing wirings or routing sub-wirings among these elements may be formed of metal wirings for a low resistance.

FIG. 2 is a plan view of a configurational structure of the electrodes formed on the substrate 1; eight electrodes (electrode) 13 in a strip shape of the column side (Y-side) are formed at a predetermined pitch so as to occupy the center of the substrate 1 in the present embodiment. Additionally, only eight electrodes 13 are shown in FIG. 2 for simplifying the description, but a few tens to a few thousands of electrodes can be arranged according to the screen resolution in an actual liquid crystal display. Furthermore, the area where the electrodes 13 are disposed is to be an area inside the seal layer 3, as shown in FIG. 1.

Then, one end side of each of the electrodes 13 (the under end side in FIG. 1 or 2) is connected to the drive circuit element 6 through connecting wirings 15 formed on the substrate 1. Moreover, at the right side of the area for forming the electrodes 13 on the substrate 1 shown in FIG. 2, routing sub-wirings 16 are formed so as to correspond to every other electrode 18 out of a plurality of electrodes 18 of the row side, which will be described below with reference to FIG. 3, formed on the substrate 2. At the left side of the area to form the electrodes 13 on the substrate 1, routing sub-wirings 17 are similarly formed so as to correspond to the remaining electrodes 18 at the interval of an electrode, which will be described below, formed on the substrate 2. Each of the routing sub-wirings 16 and 17 is connected to the drive circuit element 6 on the substrate 1.

In addition, each of the routing sub-wirings 16 includes a wiring part 16*a* extending in the same direction (X-direction) as the electrodes 18 that will be described below based on FIG. 3 to extend in the lateral direction on the substrate 1, an extending part 16*b* extending in the vertical direction (Y-direction) on the substrate 1 to extend to the end side of the substrate 1 and a connecting part 16*c* extending from the end of the substrate 1 in the lateral direction (X-direction) to connect to the drive circuit element 6. The routing sub-wirings 17 similarly each include a wiring part 17*a*, an extending part 17*b* and a connecting part 17*c*.

FIG. 3 is a plan view of a configurational structure of electrodes formed on the substrate 2; ten strip-shaped electrodes (electrode) 18 of the row side (X-side) are formed at a predetermined pitch so as to occupy the center side of the substrate 2 in the embodiment. Additionally, FIG. 3 only illustrates ten electrodes 18 for simplifying the description, but a few tens to a few thousands of electrodes can be arranged according to the screen resolution in an actual liquid crystal display. Furthermore, the area where the electrodes 18 are disposed is to be an area inside the seal layer 3 as shown in FIG. 1. In a state that the substrates 1 and 2 are layered and face each other as shown in FIG. 1, the plurality of electrodes 13 and the plurality of electrodes 18 are arranged to be in a matrix shape when viewed in a plane as described previously.

Subsequently, the right end side of the substrate 2 is formed with routing wirings 20 to alternately connect to the ends of the plurality of electrodes 18 in rows. The left end side of the substrate 2 is also formed with routing wirings 21 to alternately connect to the remaining ends of the plurality of electrodes 18 in rows. The routing wirings 20 include a connecting part 20a connected to the right end of the electrodes 18 to extend in the lateral direction (X-direction) of the substrate 2 and an extending part 20b extending to the end of the substrate 2 in the longitudinal direction (Y-direction) of the substrate 2. The routing wirings 21 also include a connecting part 21a connected to the left end of the electrodes 18 to extend in the lateral direction of the substrate 2 and an extending part 21b extending to the end of the substrate 2 in the longitudinal direction of the substrate 2.

Then, these routing wirings 20 are formed so as to correspond to the routing sub-wirings 16 on the substrate 1 previously described. The routing wirings 21 are formed to correspond to the routing sub-wirings 17 on the substrate 1 previously described. That is, in the state that the substrates 1 and 2 face each other as shown in FIG. 1, the routing sub-wirings 16 and 17 are so arranged that each of the routing sub-wirings 16 approximately overlaps with each of the routing wirings 20 when viewed in a plane and each of the routing sub-wirings 17 approximately overlaps with each of the routing wirings 21 when viewed in a plane.

Subsequently, in the state that the substrates 1 and 2 face each other as shown in FIG. 1, a part of the seal layer 3 is positioned in the portion of the connecting part 20a of each of the routing wirings 20 and the wiring part 16a of each of the routing sub-wirings 16. A part of the seal layer 3 is positioned in the portion of the connecting part 21a of each of the routing wirings 21 and the wiring part 17a of each of the routing sub-wirings 17. Additionally, the extending part 17b of the routing sub-wirings 17 and the extending part 21b of the routing wirings 21 are mainly disposed in the picture-frame area 8 at the left side of the image display regions GR. The extending part 16b of the routing sub-wirings 16 and the extending part 20b of the routing wirings 20 are mainly disposed in the picture-frame area 9 at the right side of the image display regions GR.

Then, in a portion corresponding to the picture-frame area 8 and a portion corresponding to the picture-frame area 9 between the substrates 1 and 2, a transfer member 25 is laid in the outside areas of the seal layer 3 (portions shaded in each of the outside areas in FIG. 1). The transfer member 25 includes a plurality of conductive particles 27 dispersed inside an insulating resin layer 26 with an insulating property. Any of a metal ball with a particle diameter of a few μm, a spherical conductive polymer ball and a spherical polymer ball with a metal-coated surface may be used as the conductive particle 27. Specifically, when the substrates 1 and 2 facing each other are bonded to each other to be combined, with the transfer member 25 laid in the picture-frame areas 8 and 9 in both the substrates, the extending parts 16b and 20b or the extending parts 17b and 21b formed in the substrates 1 and 2 sandwich the conductive particles 27, as shown in FIG. 3, thereby allowing vertical conduction. In addition, similarly, the transfer member 25 also performs electrical connection in the wiring parts 16a and 17a of the routing sub-wirings 16 and 17 and the extending parts 20a and 21a of the routing wirings 20 and 21 in the picture-frame areas 8 and 9.

Accordingly, electrical vertical conduction is established between each of the routing wirings 20 and each of the routing sub-wirings 16 that face each other with the substrates 1 and 2 viewed in a plane, and between each of the routing wirings 21 and each of the routing sub-wirings 17 facing each other.

Furthermore, in the case of the actual liquid crystal display, a polarizer or retardation film is disposed outside the substrates 1 and 2. However, the illustration and description of these members are omitted in the present embodiment. A backlight is disposed on the backside of the substrate when the liquid crystal display is a transmissive type, a reflective layer is disposed when it is a reflective type, and a color filter is disposed when it is a color display type. However, the description of these components is omitted in the case of the embodiment.

In the liquid crystal display A configured as described above, the drive circuit element 6 supplies image signals and scanning signals to each of the electrodes 13 and 18 at a predetermined timing to drive these electrodes 13 and 18. Thereby, alignment conditions of liquid crystal molecules laid between the crossed portions of these electrodes are controlled to allow the display to be controlled.

Figure 12:
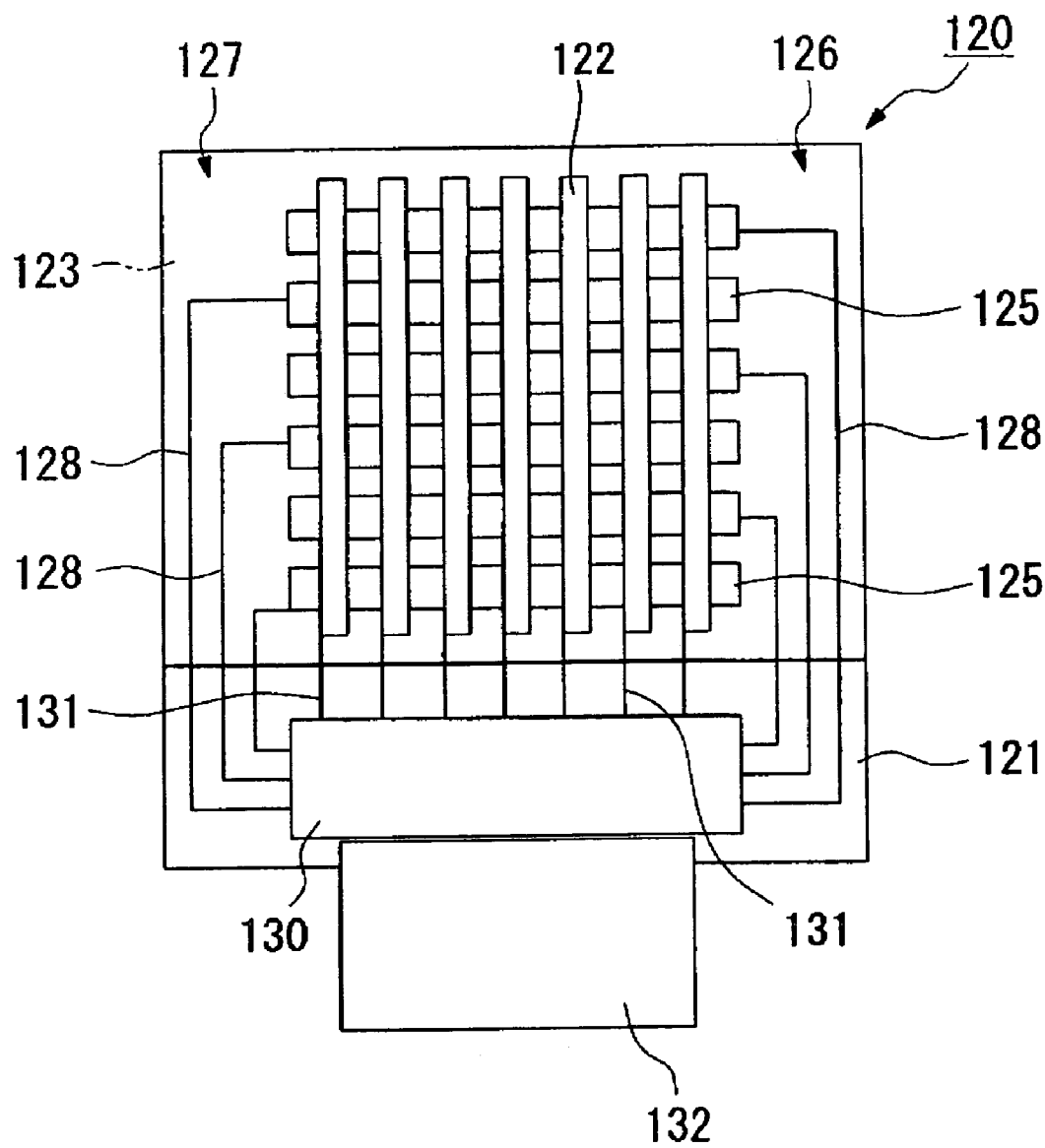
FIG. 12 is a plan view illustrating one example of the liquid crystal display proposed by the inventors.

Then, when the drive circuit element 6 applies voltage to each electrode 18 in order to drive the electrodes 18 in rows such that the same voltage is applied to the electrode 18 located closer to the drive circuit element 6 and the electrode 18 located farther from the drive circuit element 6, the routing wirings 20 and the routing sub-wirings 16 brought into vertical conduction by the transfer member 25 in the picture-frame area 8 and the routing wirings 21 and the routing sub-wirings 17 brought into vertical conduction by the transfer member 25 in the picture-frame area 9, exist between the drive circuit element 6 and the electrodes 18. Thus, resistance of the whole routing wirings including these elements can be lower than that of the structure shown in FIG. 12, and as a result, a targeted voltage can surely be applied to the electrodes 18 at any position to drive them. Accordingly, display with uniform brightness can be attained even in a part of the image display regions GR corresponding to the electrode 18 farther from the drive circuit element 6 and in a part of the image display regions GR corresponding to the electrode 18 located closer to the drive circuit element 6.

Then, in the device of the embodiment, the picture-frame areas 8 and 9 with almost an equal width are formed at the left and right sides of the image display regions GR. Therefore, the image display regions GR can be arranged in the center part of the overall liquid crystal display.

Additionally, in the embodiment, the width for each of the routing wirings 20 and 21 and the routing sub-wirings 16 and 17 is not defined particularly, but it may be set to have an equal width or an unequal width. When it is set to have an unequal width, such a structure may be adopted that the routing wirings 20 and 21 to be connected to the electrode 18 located the nearest to the drive circuit element 6 are formed to be the narrowest, the width of the routing wirings 20 and 21 is set to be greater for the routing wiring connected to an electrode 18 located farther from the drive circuit element 6, and the routing wirings 20 and 21 located farthest from the drive circuit element 6 are formed to be the widest. Additionally, the routing wirings 20 and 21 and the routing sub-wirings 16 and 17 may be formed of metal wirings. When they are formed of metal wirings, they can be formed to have resistance lower than that of transparent conductive materials such as an ITO. Thus, the width of wirings itself can be formed into a fine line, which enables a further narrower picture frame.

Furthermore, in the embodiment, the routing wirings 20 and 21 are connected to the electrodes 18 at the interval of an electrode. However, the methods and devices to connect these elements are not limited; and they may be connected at every multiple electrodes, for example.

Figure 5:
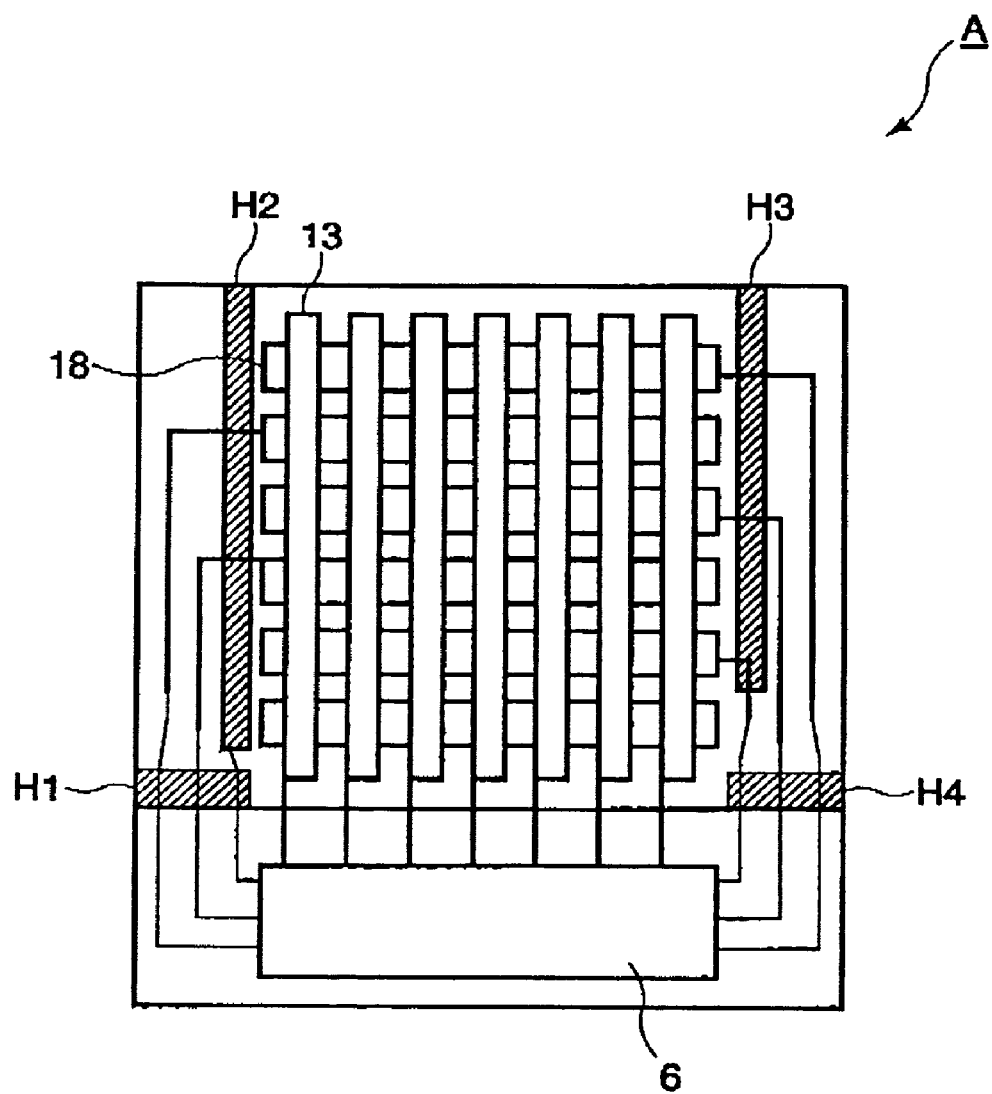
FIG. 5 is a schematic diagram showing another connection between the routing wiring and the routing sub-wiring.

FIG. 5 shows another connection between the routing wirings and the routing sub-wirings. In lieu of evenly or approximately evenly connecting, for example a routing wiring 20 and a routing sub-wiring 16 over them, i.e.

connecting them wholly as explained using FIGS. 1 to 4, it is possible to connect them via a part of the wiring 20 and a part of the sub-wiring 16 laid, for example in the hatching areas H1, H2, H3, and H4, wherein intervals among the plurality of wirings 20 around the part of the wiring 20 are larger than those thereamong around another part of the wiring 20, and also intervals among the plurality of sub-wirings 16 around the part of the sub-wiring 16 are larger than those thereamong around another part of the sub-wiring 16. Specifically, it is possible to connect the wiring 20 and the sub-wiring 16 partially. The partial connection in place of the whole connection enlarges the total resistance value of the wiring 20 and the sub-wiring 16. Such a connection, however, does not require the intervals among the extending parts 20b shown in FIG. 3 and among the extending parts 16b shown in FIG. 2 to be large enough to connect an extending part 20b and an extending part 16b corresponding thereto, whereby the intervals among the extending part 20b and among the extending parts 16b can be kept small, which enables rendering the picture-frames 8 and 9 small.

<Second Embodiment>

Figure 6:
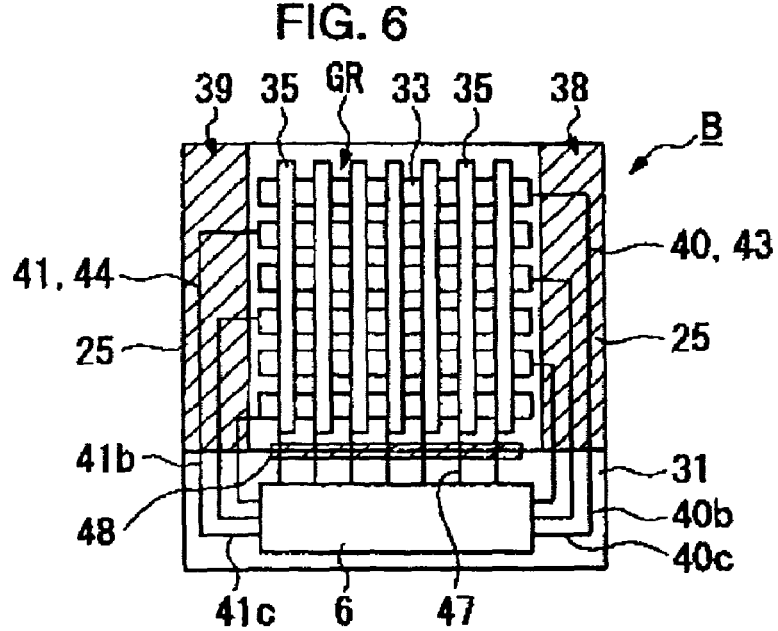
Figure 6:
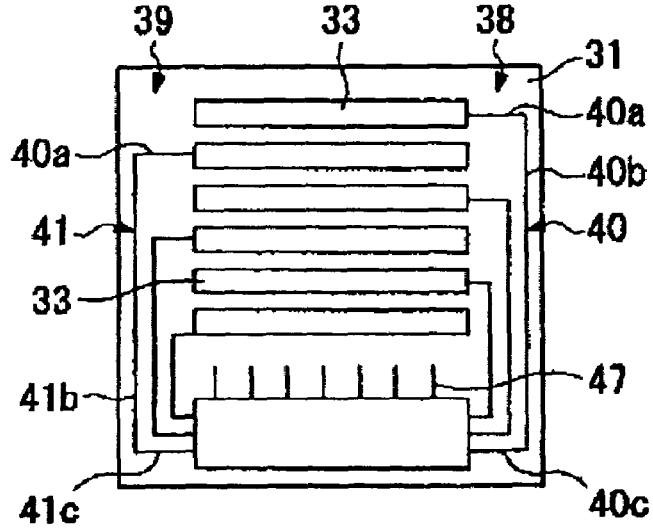
Figure 6:
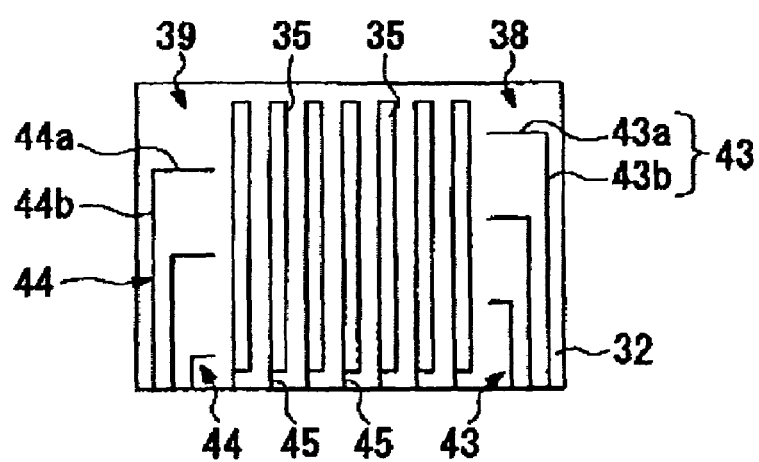

FIGS. 6(a), 6(b) and 6(c) depict a second embodiment where the invention is applied to a passive matrix liquid crystal display (electro-optical device). FIG. 6(a) is a schematic plan view illustrating a liquid crystal display of the embodiment. FIG. 6(b) is a schematic plan view illustrating electrodes and routing wirings on one of substrates of the liquid crystal display. FIG. 6(c) is a schematic plan view illustrating electrodes and routing wirings on the other of the substrates of the liquid crystal display. Additionally, in each of the drawings, layers and members are drawn in different scales in order to allow each layer and each member to recognizable on the drawings.

A liquid crystal display B of the second embodiment is one example of a liquid crystal display in which the wiring structures are reversed between one substrate side and the other substrate side of the liquid crystal display A of the first embodiment. Thus, the same components are provided with the same reference numerals, and the description thereof is omitted.

Furthermore, in the second embodiment, the structure, where a substrate 31, one of the substrates, faces a substrate 32, the other of the substrates, to hold liquid crystals therebetween, and a seal layer is disposed between the substrates, is the same as the first embodiment. Thus, FIG. 6(a) only depicts a principal part of the electrodes and the wiring structure. FIG. 6(b) only depicts the configurational structure of the electrodes and the routing wirings on the substrate 31. FIG. 6(c) only depicts the configurational structure of the electrodes and the routing wirings on the substrate 32. The description and explanation of the detailed structure of the portions such as the seal layer are omitted.

As shown in FIG. 6(b), the substrate 31 is formed with a plurality of electrodes 33 in rows at a predetermined pitch. As shown in FIG. 6(c), the substrate 32 is formed with a plurality of electrodes 35 in columns at a predetermined pitch. In a state that the substrate 31 faces the substrate 32 as shown in FIG. 6(a), the plurality of electrodes 33 and the plurality of electrodes 35 are so configured that they are arranged in a matrix shape when viewed in a plane to configure image display regions GR.

In a picture-frame area 38 at the right side of the image display regions GR of the substrate 31, routing wirings 40 for electrodes are disposed to connect to the right end of the electrodes 33 at the interval of an electrode. In a picture-frame area 39 at the left side of the image display regions GR, routing wirings 41 are disposed to connect to the left end part of the remaining electrodes 33 at the interval of an electrode. As with the case of the routing wirings of the first embodiment, each of the routing wirings 40 includes a connecting part 40a extending along the electrodes 33 in the lateral direction to connect to the end part of the electrodes 33, an extending part 40b extending in the longitudinal direction of the substrate 31 and a connecting part 40c extending in the lateral direction of the substrate 31 to connect to the drive circuit element 6. Each of the routing wirings 41 also include a connecting part 41a, an extending part 41b and a connecting part 41c.

Subsequently, the picture-frame area 38 at the right side of the electrodes 35 on the substrate 32 shown in FIG. 6(c) is formed with routing sub-wirings 43 that include a wiring part 43a in the same form as the connecting part 40a of the routing wirings 40, and an extending part 43b extending in the same direction as the extending part 40b. The picture-frame area 39 on the left side of the substrate 32 is also formed with routing sub-wirings 44 that include a wiring part 44a in the same form as the connecting part 41a of the routing wirings 41 and an extending part 44b extending in the same direction as the extending part 41b.

Accordingly, as shown in FIG. 6(a), the routing wirings 40 overlap with the routing sub-wirings 43 when viewed in a plane in the state that the substrates 31 and 32 face each other, and the routing wirings 41 overlap with the routing sub-wirings 44 when viewed in a plane. Then, as with the case of the first embodiment, a transfer member 25 disposed between the picture-frame areas 38 and 39 on both sides of the substrates 31 and 32 allows conduction between the routing wirings 40 and the routing sub-wirings 43, and between the routing wirings 41 and the routing sub-wirings 44.

Additionally, on the under end side of the electrodes 35 in columns on the substrate 32, a plurality of connecting wirings 45 that is connected to each of the electrodes 35 and extended to the end side of the substrate 31 is formed. These connecting wirings 45 are connected to connecting wirings 47 connected to a drive circuit element 6 on the substrate 31 through a transfer member 48.

The liquid crystal display B with the substrates 31 and 32 of the structure shown in FIG. 6(a) can also attain the same advantages as the liquid crystal display A of the first embodiment.

That is, in the liquid crystal display configured as described above, the drive circuit element 6 supplies image signals and scanning signals to each of the electrodes 33 and 35 at a predetermined timing to drive the electrodes. Thereby, the alignment of liquid crystals between the electrodes is controlled to allow the display to be controlled.

Then, when the drive circuit element 6 applies voltage to each electrode 33 in order to drive the electrodes 33 in rows such that voltage is applied to the electrode 33 located closer to the drive circuit element 6 and the electrode 33 located farther from the drive circuit element 6, the routing wirings 40 and the routing sub-wirings 43 brought into vertical conduction by the transfer member 25 in the picture-frame area 38 or the routing wirings 41 and the routing sub-wirings 44 brought into vertical conduction by the transfer member 25 in the picture-frame area 39 exist between the drive circuit element 6 and the electrodes 33. Thus, wiring resistance of these elements can be lower than that of the structure shown in FIG. 12, and as a result, a targeted voltage can surely be applied to the electrodes 33 at any position to drive them. Accordingly, uniform brightness can also be attained at a part of the image display regions GR where the electrode 33 far from the drive circuit element 6 is positioned.

Then, the same effect as the first embodiment can be attained in that the image display regions GR can be arranged in the center part of the overall liquid crystal display because the picture-frame areas 38 and 39 with almost an equal width are formed at the left and right sides of the image display regions.

<Third Embodiment>

Figure 7:
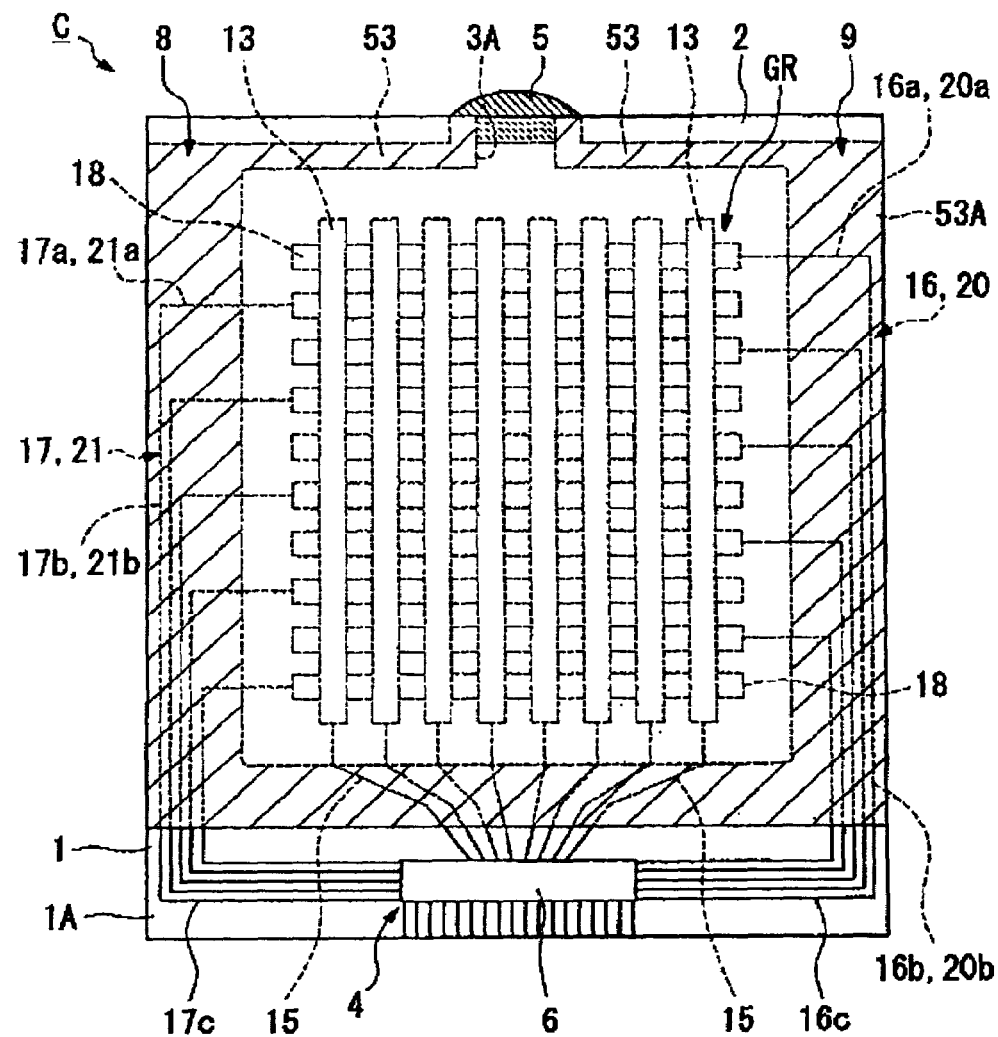
FIG. 7 is a plan view illustrating the schematic structure of the liquid crystal display of the third embodiment in accordance with the present invention.

FIG. 7 is a plan view illustrating a third embodiment where the invention is applied to a passive matrix liquid crystal display (electro-optical device). Additionally, in FIG. 7, layers and members are drawn in different scales in order to allow each layer and each member to be recognizable on the drawings.

A liquid crystal display C of the third embodiment has almost the same wiring structure of the liquid crystal display A of the first embodiment, but it is one embodiment of the structure where the position of forming a seal layer is widely disposed to extend to picture-frame areas and the seal layer is provided with a function of enabling vertical conduction.

Furthermore, in the third embodiment, the structure where a substrate 1, which is one of the substrates, faces a substrate 2, which is the other of the substrates, to hold liquid crystals therebetween, and the seal layer is disposed between the substrates is the same as the first embodiment. Therefore, the description for these portions is omitted.

The third embodiment employs a structure where conductive particles are dispersed inside a seal layer 53, and the seal layer 53 also serves as a transfer member.

That is, the seal layer 53 is expanded to have extending parts 53A and 53B extending to picture-frame areas 8 and 9 on the left and right sides of the substrates 1 and 2.

The structure of the other portions is the same as the liquid crystal display A of the first embodiment. Thus, the same portions are designated the same reference numerals and signs, omitting the description of the same portions.

The liquid crystal display C having the substrates 1 and 2 and the seal layer 53 of the structure shown in FIG. 7 can also attain the same operation and effect as the liquid crystal display A of the first embodiment.

That is, in the liquid crystal display C configured as described above, a drive circuit element 6 supplies image signals and scanning signals to each of electrodes 13 and 18 at a predetermined timing to drive the electrodes. Thereby, the alignment of liquid crystals between the electrodes is controlled to allow the display to be controlled.

Then, when the drive circuit element 6 applies voltage to each electrode 18 in order to drive the electrodes 18 in rows such that the same voltage is applied to the electrode 18 located closer to the drive circuit element 6 and the electrode 18 located farther from the drive circuit element 6, routing wirings 20 and routing sub-wirings 16 brought into vertical conduction by the seal layer 53A in the picture-frame area 8 or routing wirings 21 and routing sub-wirings 17 brought into vertical conduction by the seal layer 53B in the picture-frame area 9 exist between the drive circuit element 6 and the electrodes 18. Thus, wiring resistance of these elements can be lower than that of the structure shown in FIG. 12, and as a result, a targeted voltage can surely be applied to the electrodes 18 at any position to drive them. Accordingly, uniform brightness can be attained also at a part of the image display regions GR corresponding to the electrode 18 located farther from the drive circuit element 6 and a part of the image display regions GR corresponding to the electrode 18 located closer to the drive circuit element 6.

Then, the picture-frame areas 8 and 9 with almost an equal width are formed at the left and right sides of the image display regions. Therefore, the image display regions GR can be arranged in the center part of the overall liquid crystal display.

In this case, the vertical conduction between the routing wirings 20 and 21 and the routing sub-wirings 16 and 17 is established at the same time when the seal layer 53 is formed shown in FIG. 7. The manufacturing processes can be further simplified. Thus, there is the effect of reducing manufacture costs of the overall device. Additionally, a liquid crystal display is fabricated in a manner that balls such as silica ($SiO_2$), called a gap agent, are dispersed to uniformly control a thickness of a liquid crystal layer and pressure is applied to the substrates 1 and 2 to form a specific cell gap. However, the balls such as silica cannot control light.

On this account, when a uniform gap (a thickness of the liquid crystal layer) is to be obtained, the gap agent needs to be dispersed a great deal, but the display quality is degraded as more of the gap agent is dispersed. The gap agent is mixed into the seal layer 53 with conductive particles 27, and thereby the gap agent in the image display regions GR can be reduced. Accordingly, a light control area of the image display regions GR is increased and the high-quality display can be performed. In a liquid crystal display applied to a mobile telephone, the image display regions GR are small. Thus, only the gap agent in the seal layer can sufficiently secure the thickness accuracy of the liquid crystal layer without dispersing the gap agent in the regions. In this case, the manufacturing process to disperse the gap agent is also omitted, and further cost saving can be attained.

Figure 8:
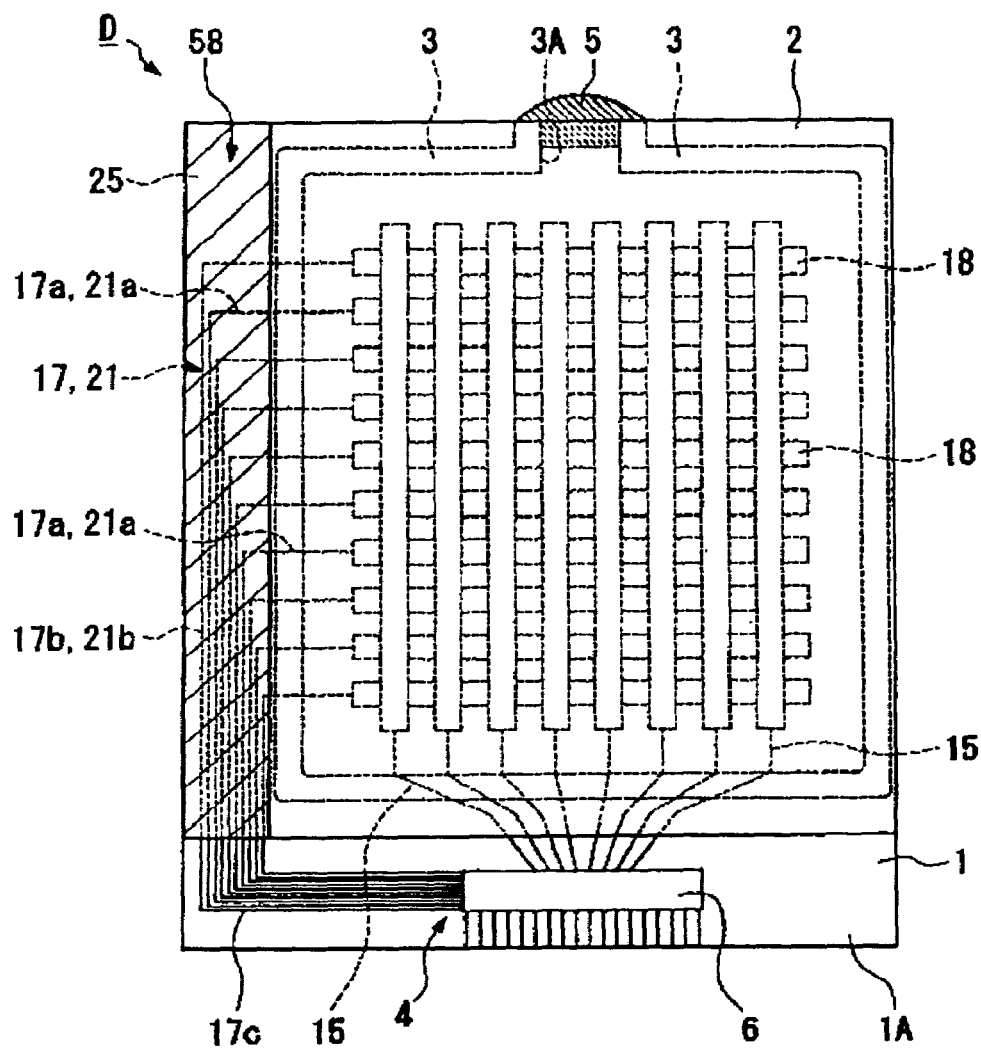
FIG. 8 is a plan view illustrating the schematic structure of the liquid crystal display of the fourth embodiment in accordance with the present invention.

FIG. 8 depicts a fourth embodiment of a liquid crystal display (electro-optical device) in accordance with the invention. The embodiment shows a structure where routing wirings are only disposed at one side (on the left side in the drawing), and not evenly disposed at both the left and right sides of the image display regions GR.

In the liquid crystal display (electro-optical device) D of the fourth embodiment, the picture-frame area 8 is omitted, which is disposed at the right side of the seal layer 3 in the first embodiment. Instead, a picture-frame area 58 at the left side of the seal layer 3 is formed to have a width wider than that of the first embodiment. Then, routing wirings 21 to be connected to electrodes 18 in rows are disposed so that each of the routing wirings 21 is connected to each of the entire electrodes 18, not at the interval of an electrode. Similarly, routing sub-wirings 17 are formed corresponding to the entire routing wirings 21. Instead, a picture-frame area at the right side of the image display regions GR is not formed with the routing wirings and the routing sub-wirings.

The rest of the structure is the same as the first embodiment.

In the liquid crystal display D having the picture-frame area 58, the routing wirings 21 and the routing sub-wirings 17 of the structure shown in FIG. 8, the image display regions GR cannot be disposed in the center part of the device, but except that, the same operation and effect as the liquid crystal display A of the first embodiment can be attained.

More specifically, when a drive circuit element 6 applies voltage to each electrode 18 in order to drive the electrodes 18 in rows such that voltage is applied to the electrode 18 located closer to the drive circuit element 6 and the electrode 18 located farther from the drive circuit element 6, the routing wirings 21 and the routing sub-wirings 17 brought into vertical conduction by a transfer member 25 in the picture-frame area 58 exist between the drive circuit element 6 and the electrodes 18. Thus, wiring resistance can be lower than that of the structure shown in FIG. 12, and as a result, a targeted voltage can surely be applied to the electrodes 18 at any position for to drive them. Accordingly, uniform brightness can also be attained in the image display regions GR far from the drive circuit element 6 and in the image display regions GR near the drive circuit element 6.

Meanwhile, in the embodiments described above, the examples where the invention is applied to the passive matrix liquid crystal display have been described. However, the invention can be applied to an active matrix liquid crystal display (electro-optical device) where a two-terminal linear element serves as a switching element.

Figure 9:
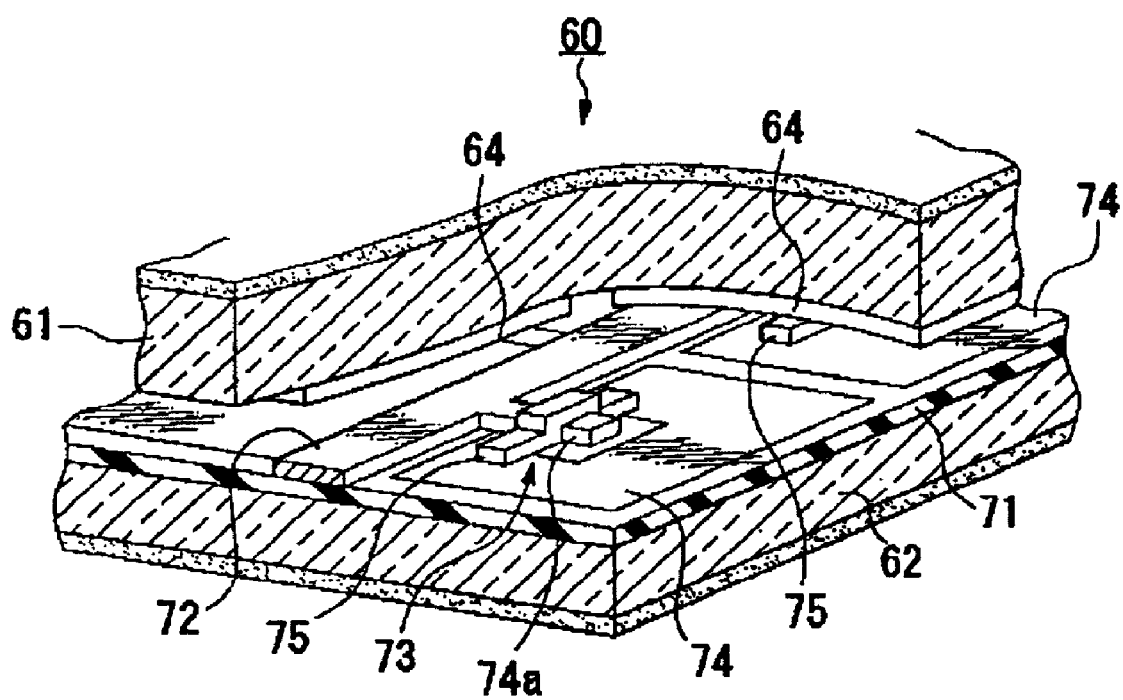
FIG. 9 is a partial sectional perspective view illustrating the schematic structure of the image display region on the substrate of the liquid crystal display of the fifth embodiment in accordance with the present invention.

FIG. 9 is a partial perspective view of a principal part of a wiring circuit in an image display region of the active matrix liquid crystal display including the two-terminal linear element of this type serving as the switching element. The embodiment is configured in which a substrate 62 on the element side faces a counter substrate 61 through a predetermined cell gap, and liquid crystals, not shown in FIG. 9, are sealed between the substrates 61 and 62, and a plurality of strip-shaped scanning electrodes (electrode) 64 is formed on the counter substrate 61 at a predetermined pitch.

Additionally, the substrate 62 on the element side is formed with an insulating film 71, a plurality of signal lines 72 formed at a predetermined pitch and a plurality of thin film diodes 73. Among these elements, the signal lines 72 are disposed orthogonal to the scanning electrodes 64 at a predetermined pitch. A plurality of pixel electrodes (electrode) 74 is arranged between the adjacent scanning electrodes 64. Areas where the plurality of the scanning electrodes 64 crosses the plurality of signal lines 72 when viewed in a plane are to be image display regions.

Furthermore, the thin film diodes 73 are provided with a flake-shaped element part 74a extended from the signal line 72 to the pixel electrode 74 side, and an insulating film is formed on the element part 74a. Then, a conductive film 75 is formed so as to cover the element part 74a and partially overlap the pixel electrode 74.

Moreover, a color filter and a black matrix are formed on the counter substrate 61 when the liquid crystal display is a color display convertible type, but FIG. 9 omits these elements.

Also in the liquid crystal display configured as described above, the plurality of scanning electrodes (electrode) 64 is formed at a predetermined pitch, and each of the scanning electrodes 64 is connected to the drive circuit element disposed on the substrate. Thus, the structure of the invention can be applied to the routing wirings to be connected to the end of the scanning electrodes 64 as with the case of the first embodiment. That is, assuming that the plurality of the electrodes 18 shown in FIG. 1 is considered to be the scanning electrodes 64 in the embodiment, the routing wirings are disposed in a picture-frame area of the substrate 61, the routing sub-wirings are formed in a picture-frame area of the substrate 62 and the routing wirings are connected to the routing sub-wirings by a transfer member provided between the picture-frame areas of the substrates 61 and 62. The routing wirings can be formed to have a lower resistance, and the same effective voltage can be applied to the electrode located farther from the drive circuit element and the electrode located closer to the drive circuit element as with the case of the first embodiment.

<Embodiment of Electronic Devices>

Next, specific examples of electronic devices including any one of the liquid crystal displays (electro-optical devices) of the first to fifth embodiments will be described.

Figure 10:
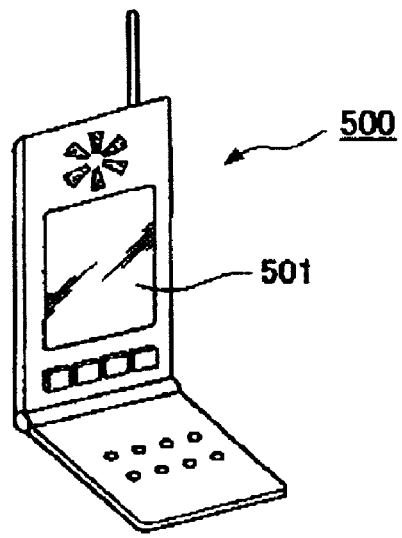
Figure 10:
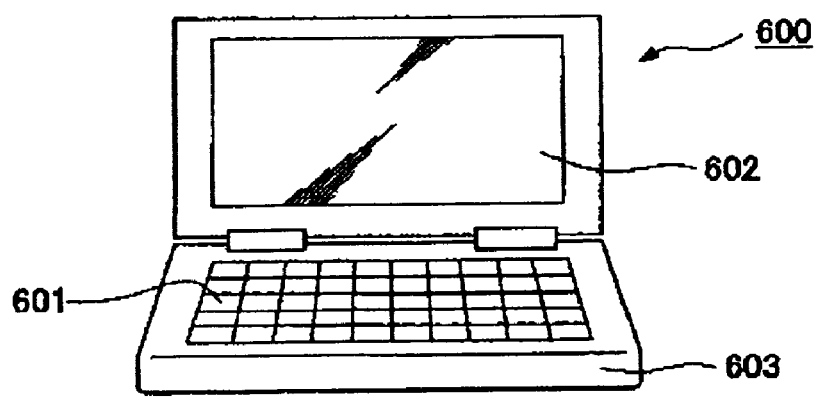
Figure 10:
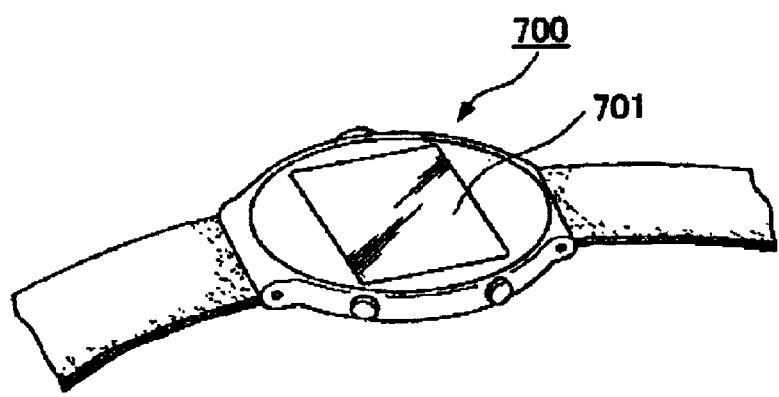
Figure 11:
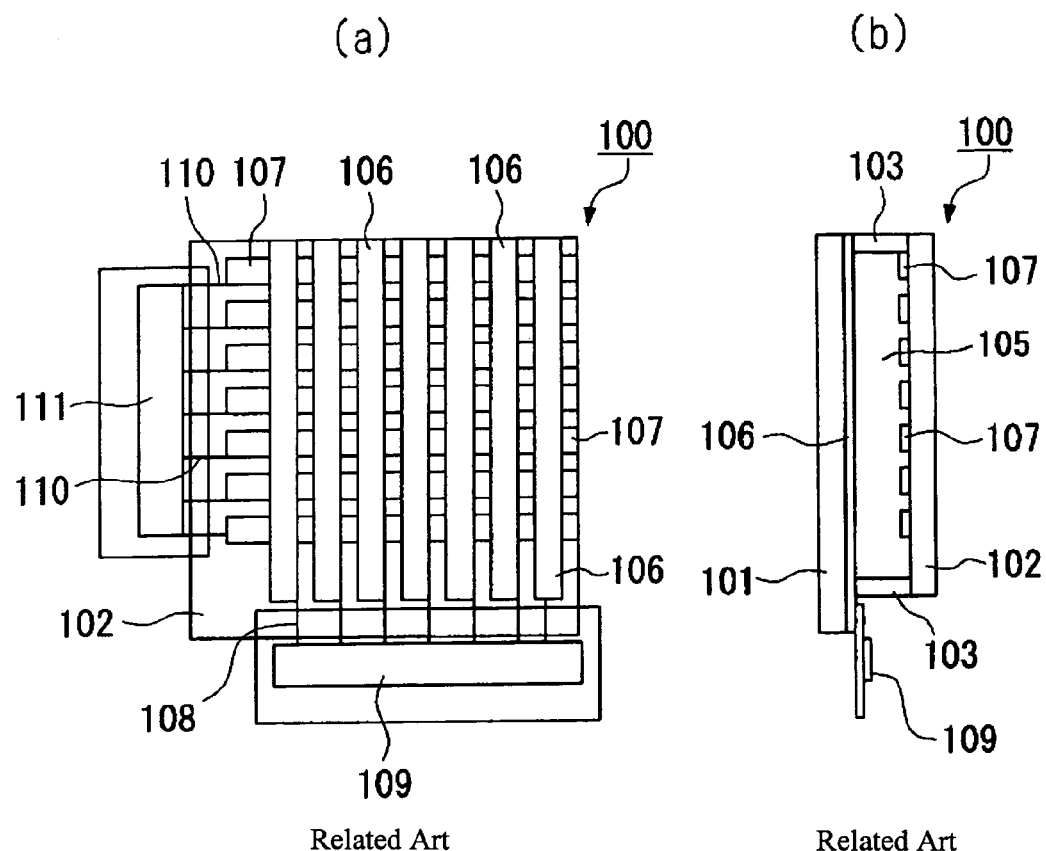
FIGS. 11(*a*) and 11(*b*) are plan views of one example of a related art liquid crystal display; wherein FIG. 11(*a*) is a plan view illustrating the configurational structure of the electrodes arranged in a matrix shape.

FIG. 10(a) is a perspective view illustrating one example of a mobile telephone.

In FIG. 10(a), reference numeral 500 denotes a mobile telephone main body, and reference numeral 501 denotes a liquid crystal display unit using any one of the aforementioned liquid crystal displays.

FIG. 10(b) is a perspective view illustrating one example of a mobile information processing unit, such as a word processor or personal computer.

In FIG. 10(b), reference numeral 600 denotes an information processing unit, reference numeral 601 denotes an input part such as a keyboard, reference numeral 603 denotes an information processing unit main body, and reference numeral 602 denotes a liquid crystal display unit using any one of the liquid crystal displays.

FIG. 10(c) is a perspective view illustrating one example of a wristwatch-type electronic device.

In FIG. 10(c), reference numeral 700 denotes a watch main body, and reference numeral 701 denotes a liquid crystal display unit using any one of the liquid crystal displays.

Each of the electronic devices shown in FIGS. 10(a) to 10(c) is equipped with the liquid crystal display unit using any one of the liquid crystal displays. Thus, they perform an evenly bright display mode and include the narrow picture-frame areas provided evenly at the left and right sides of the image display regions, providing high display quality.

As described above, according to the invention, the routing wirings and the routing sub-wirings are formed to face each other in the picture-frame areas outside the image display regions on the substrates facing each other and are connected by the transfer member. Thus, wiring resistance can be lowered than in the case of the wiring only with the routing wirings.

Accordingly, the structure of the invention has a feature that can perform display hardly causing degraded signal waveforms without generating uneven brightness, even though the drive circuit applies signals to the scanning electrodes or signal electrodes at any position in the image display regions.

According to the invention, the picture-frame areas with an equal width are formed at the left and right sides of the image display regions and thus the image display regions can be arranged in the center part of the device. Further, the electro-optical device can be provided that can perform display hardly causing degraded signal waveforms without generating uneven brightness as described previously.

According to the invention, specifically as the transfer member, members with a plurality of conductive particles dispersed inside the insulating resin layer can be employed. However, those members that are widely utilized as transfer members for liquid crystal displays in general can be utilized. The vertical conduction is easily completed by sandwiching the transfer member with a pair of substrates that press each other, and sandwiching the conductive particles inside thereof with the routing wirings or routing sub-wirings.

In the invention, a part of the area disposed with the seal layer is formed to be the picture-frame areas to provide the routing wirings and the routing sub-wirings. The plurality of conductive particles is dispersed inside the seal layer to bring the routing wirings and the routing sub-wirings into vertical conduction. The structure where the seal layer also serves as the transfer member can be adopted.

In the invention, when the width of the routing wiring for the electrode located farther from the drive circuit is formed to be greater than that of the routing wiring for the electrode located closer to the drive circuit, the wiring resistance of the routing wiring for the electrode located far from the drive circuit can be lowered, and display with uniform brightness can be performed with respect to the electrodes at any position in the image display regions.

The invention can also be applied to the configuration where the signal electrode includes a pixel electrode part formed at every pixel and a two-terminal nonlinear element disposed between a signal wiring part and the pixel electrode part. A device can be provided that can perform display without generating uneven brightness even though the drive circuit applies signals to the electrodes at any position in the image display regions.

The electronic devices of the invention include any one of the electro-optical devices described above as a display, for example. Thus, they have a feature of performing display with no uneven brightness.

What is claimed is:

1. An electro-optical device, comprising:
   a plurality of electro-optical elements;
   a first substrate formed with a plurality of first electrodes that supplies a plurality of first signals to drive the plurality of electro-optical elements;
   a second substrate facing the first substrate, the second substrate formed with a plurality of second electrodes that supplies a plurality of second signals to drive the plurality of electro-optical elements, the plurality of first electrodes and the plurality of second electrodes being formed in a matrix shape;
   a transfer member; and
   a drive circuit connected to at least one of the first substrate and the second substrate to supply the plurality of first signals and the plurality of second signals to the plurality of first electrodes and the plurality of second electrodes, respectively, the first substrate being formed with a plurality of first wirings through which the drive circuit supplies the plurality of first signals to the plurality of first electrodes, and the second substrate being formed with a plurality of second wirings through which the drive circuit supplies the plurality of first signals to the plurality of first electrodes, the plurality of second wirings facing and being connected to the plurality of first wirings through the transfer member.

2. An electro-optical device according to claim 1, comprising:
   a plurality of first wirings having wiring portions extending in parallel with each other,
   a plurality of second wirings having wiring portions extending in parallel with each other; and
   a face defined by the wiring portion of each of the plurality of first wirings and the corresponding wiring portion of each of the plurality of second wirings is orthogonal to each of a face defined by the wiring portions of the plurality of first wirings and a face defined by the wiring portions of the plurality of second wirings.

3. An electro-optical device according to claim 1, wherein each first wiring and a second wiring corresponding thereto is connected via a part of the first wiring and a part of the second wiring, intervals among the part of the first wiring and parts of first wirings other than the first wiring corresponding to the part thereof being larger than intervals among an other part of first wiring and parts of first wirings other than the first wiring corresponding to the other part thereof, and intervals among the part of the second wiring and parts of second wirings other than the second wiring corresponding to the part thereof being larger than intervals among an other part of second wiring and parts of second wirings other than the second wiring corresponding to the other part thereof.

4. An electro-optical device, comprising:
   a substrate formed with a plurality of signal electrodes;
   a plurality of routing wirings;
   a transfer member;
   another substrate formed with a plurality of scanning electrodes facing the substrate, the plurality of signal electrodes and the plurality of scanning electrodes being arranged in a matrix shape when viewed in a plane to define image display regions, the substrate being formed with a drive circuit to drive the signal electrodes and the scanning electrodes, the drive circuit being connected to at least one of each of the signal electrodes and each of the scanning electrodes through the plurality of routing wirings formed on each of the substrates;
   the routing wirings to connect the drive circuit to the electrodes are formed on one of the substrates that corresponds to a picture-frame area located at the end side of the electrodes extending in one of the directions along which the plurality of electrodes are arranged in a matrix shape, routing sub-wirings are formed in a picture-frame area on the other substrate not formed with the routing wirings so as to face the routing wirings, and the routing wirings and the routing sub-wirings facing each other on both the substrates are conducted by the transfer member laid between the substrates.

5. The electro-optical device according to claim 4, electrodes of a column side being formed on the one of the substrates, electrodes of a row side are being formed on the other of the substrates, the routing sub-wirings being formed in picture-frame areas formed on left and right sides of the one of the substrates, routing wirings for the electrodes of a row side being formed in picture-frame areas on left and right sides of the other of the substrates, the routing sub-wirings on the one of the substrates being connected to the routing wirings on the other of the substrates facing the routing sub-wirings by the transfer member, the electrodes of a column side on the one of the substrates being connected to a drive circuit through connecting wirings of a column side formed on the one of the substrates, and the routing sub-wirings on the one of the substrates being connected to a drive circuit through connecting wirings of a row side formed on the one of the substrates.

6. The electro-optical device according to claim 4, electrodes of a row side being formed on the one of the substrates, electrodes of a column side being formed on the other of the substrates, routing wirings connected to the electrodes of a row side being formed in picture-frame areas formed on left and right sides of the one of the substrates, routing sub-wirings for the electrodes of a row side being formed in picture-frame areas formed on left and right sides of the other of the substrates, the routing wirings on the one of the substrates being connected to the routing sub-wirings on the other of the substrates facing the routing wirings by the transfer member, the electrodes of a column side on the other of the substrates being connected to a drive circuit through connecting wirings of a column side formed on the one of the substrates, and the routing wirings on the one of the substrates being connected to a drive circuit through connecting wirings of a row side formed on the one of the substrates.

7. The electro-optical device according to claim 4, picture-frame areas having an equal width being formed on left and right sides of the image display regions.

8. The electro-optical device according to claim 4, the routing sub-wirings being formed to be independent wirings not connected to any one of the electrodes on the substrate formed with the routing sub-wirings.

9. The electro-optical device according to claim 4, the transfer member including a plurality of conductive particles dispersed inside an insulating resin layer.

10. The electro-optical device according to claim 4, liquid crystals being sealed between a pair of substrates by a seal layer laid in a peripheral part of the pair of substrates, a part of an area disposed with the seal layer being formed to be a picture-frame area disposed with the routing wirings and the routing sub-wirings, a plurality of conductive particles being dispersed inside the seal layer, and the conductive particles bringing the routing wirings and the routing sub-wirings into vertical conduction.

11. The electro-optical device according to claim 10, a gap agent to control a thickness of a liquid crystal layer being dispersed in the seal layer.

12. The electro-optical device according to claim 4, the plurality of routing wirings formed on the picture-frame areas including a routing wiring for an electrode located farther from the drive circuit that has a width greater than another routing wiring for another electrode located closer to the drive circuit, with the electrodes being connected to the drive circuit.

13. The electro-optical device according to claim 4, the signal electrodes include a pixel electrode part formed at every pixel and a two-terminal nonlinear element disposed between a signal wiring part and the pixel electrode part.

14. An electronic device, comprising:
an electro-optical device according to claim 4.

15. An electro-optical device comprising:
a plurality of electro-optical elements;
a first substrate having a first plurality of electrodes connected to the plurality of electro-optical elements and a plurality of first wirings connected to the plurality of first electrodes;
a second substrate facing the first substrate and having a second plurality of electrodes connected to the plurality of electro-optical elements and a plurality of second wirings connected to the plurality of second electrodes, the plurality of second electrodes forming a matrix with the plurality of first electrodes, and the plurality of second wirings facing the plurality of first wirings;
a seal layer provided between the first substrate and the second substrate;
a transfer member provided outside the seal layer and having a width greater than the seal layer, the transfer member being disposed between, and connected to, the plurality of first wirings and the plurality of second wirings, the transfer member including an insulating resin layer and a plurality of conductive particles dispersed inside the insulating resin layer; and
a drive circuit connected to at least one of the first substrate and the second substrate and connected to the plurality of first wirings to supply a plurality of first drive signals to the plurality of electro-optical elements via the plurality of first electrodes, and connected to the plurality of second wirings to supply a plurality of second drive signals to the plurality of electro-optical elements via the plurality of second electrodes.

16. An electro-optical device comprising:
a plurality of electro-optical elements;
a first substrate having a first plurality of electrodes connected to the plurality of electro-optical elements and a plurality of first wirings connected to the plurality of first electrodes, portions of the plurality of first wirings being arranged in parallel;
a second substrate facing the first substrate and having a second plurality of electrodes connected to the plurality of electro-optical elements and a plurality of second wirings connected to the plurality of second electrodes, the plurality of second electrodes forming a matrix with the plurality of first electrodes, and the plurality of second wirings facing the plurality of first wirings, portions of the second wirings being arranged in parallel and overlapping the wiring portions of the plurality of first wirings;
an image display region defined where the plurality of first electrodes and the plurality of second electrodes form the matrix;
a picture frame area located outside the image display region, the plurality of first wirings and the plurality of second wirings being arranged in the picture frame area;
a transfer member disposed between, and connected to, the plurality of first wirings and the plurality of second wirings; and
a drive circuit connected to at least one of the first substrate and the second substrate and connected to the plurality of first wirings to supply a plurality of first drive signals to the plurality of electro-optical elements via the plurality of first electrodes, and connected to the plurality of second wirings to supply a plurality of second drive signals to the plurality of electro-optical elements via the plurality of second electrodes.

* * * * *